Nov. 24, 1942.  E. M. SKINNER  2,302,916
PROCESS OF DESALTING CRUDE OIL
Filed July 26, 1940
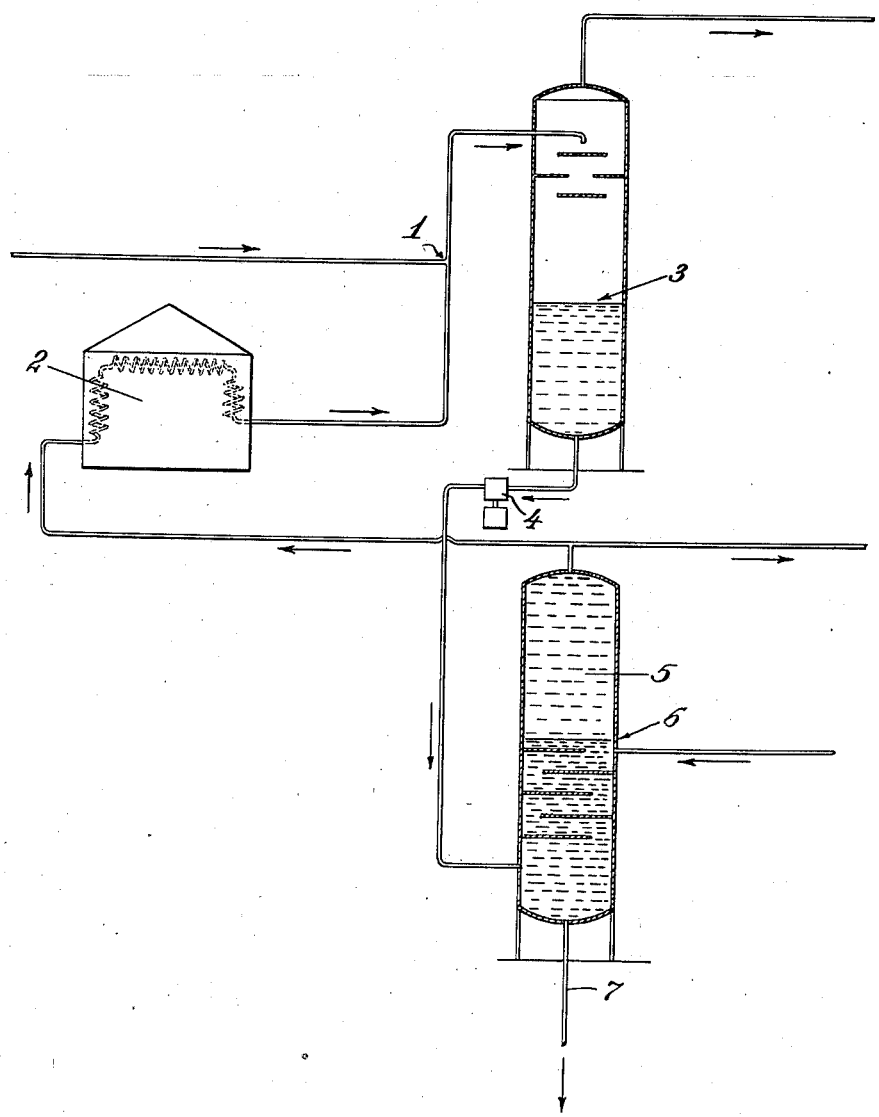
Emory M. Skinner
INVENTOR
BY
ATTORNEY Patented Nov. 24, 1942

2,302,916

UNITED STATES PATENT OFFICE 2,302,916

PROCESS OF DESALTING CRUDE OIL

Emory M. Skinner, Augusta, Kans., assignor to Socony-Vacuum Oil Company, Incorporated, New York, N. Y., a corporation of New York Application July 26, 1940, Serial No. 347,723

5 Claims. (Cl. 252—348)

This invention relates to processes for the removal of salt from crude petroleum oils prior to distillation thereof. Salt occurs in variable amounts in crude petroleum, either as dispersed salt, or, more frequently, in the form of salt water. The most usual form is that of salt (this term is inclusive of other inorganic impurities as well as the more common sodium chloride), dissolved in water which water may be dispersed in the oil as a relatively fine suspension, or may be present therein as emulsion. Quite often these emulsions are very stable. The salt water is usually a salt brine containing chloride of sodium, magnesium, and/or calcium, together with certain insoluble matter such as sand.

When permitted to pass to a distillation unit in the crude petroleum, this salt usually is deposited out at some point where the temperature becomes sufficiently great to break the emulsion and liberate the water in vapor form. The resulting deposits clog the passages in equipment, are frequently corrosive in nature, and when deposited upon heat transfer surface render such surface partially or completely inoperative.

Many salt-in-oil conditions can be solved by a relatively simple washing with water, accompanied by more or less heating. Others, particularly some of the more stable forms of emulsions, defy treatment by these usual means.

The present invention is directed particularly to a method of treatment applicable to the most stable forms of emulsions, and has been capable of effectively removing salt in certain circumstances where methods known to the prior art have failed.

This invention has for its object the provision of a method of desalting crude oil capable of resolving even the most stable admixtures of salt and oil.

It has for a further object the provision of a method of handling salt crudes whose salt is present in a stable emulsion or suspension by first completely destroying the emulsion, leaving the salt in the oil in a form capable of comparatively ready removal, and then removing that salt.

This invention may be most conveniently understood by reference to the drawing which is a part of this specification, the single figure of which shows in diagram form a set up of apparatus capable of being used for practicing my invention.

Referring to Figure 1, the raw crude oil is introduced into the system at point 1. Here this raw crude is mixed with a stream of the same oil from which the water and salt have been removed and which has been heated in a heater 2. This hot mixture is introduced into tower 3 and is here directed downward over a series of staggered baffles. All water contained in the oil is caused to vaporize as the heated mixture flows to the tower or as it spills across the baffles. The heat content of the mixture must be sufficient to supply the latent heat of the water, the latent heat of any oil fractions which may vaporize under the operating conditions and to leave the unvaporized oil at a temperature slightly higher than the boiling point of saturated salt brine at the operating pressure of tower 3. The operating pressure of tower 3 may be any pressure consistent with the operating pressure of other processing equipment operating in conjunction with this desalting system. The water and oil vapors are carried from the top of tower 3 to a condenser or other equipment for the desired subsequent processing. In a crude oil distilling system these vapors may be introduced directly into the vapor section of the main crude fractionating tower. A pool of any desired magnitude is maintained in the base to tower 3.

The warm oil collected in the base of tower 3 will contain substantially all of the salt which was carried in the brine in the raw oil. This salt will be widely dispersed grains of various size containing only their water of crystallization. In this form, the salt can be dissolved by washing the oil with fresh water under a mild mixing condition which will not reestablish a stable oil-water emulsion.

The salt bearing oil from tower 3 is pumped by pump 4 and discharged near the base of tower 5. The lower section of tower 5 is fitted with baffle plates or other suitable mechanical device which will not permit a direct flow of fluid through the vessel. These baffle plates are completely submerged by water. As the oil passes upward through this pool of water the salt is dissolved by the water. The oil collects in the upper portion of tower 5 substantially free of salt. The degree of salt removal is dependent largely upon the prevention of vigorous agitation which might carry some water away in the oil phase and upon the settling time provided in the oil layer in the upper portion of tower 5. The temperature maintained in tower 5 is not fixed but depends largely upon the emulsifying tendency of the oil. For a crude oil having a specific gravity of approximately 0.835 the temperature in tower 5 should not be lower than 200° F. for best results. The operating pressure in tower 5 must be slightly higher than the vapor pressure of water at the operating temperature.

Fresh water is introduced into tower 5 at point 6 and salt water is withdrawn at point 7. The quantity of water introduced and withdrawn must be no less than that required to dissolve the amount of salt present in the oil. A greater quantity of water must be introduced and withdrawn if the mechanical arrangement in the base of tower 5 permits appreciable circulation of the water maintained in the pool.

From the top of tower 5 substantially dry and salt free oil is allowed to escape. The amount required as a heat carrier is conducted to the heater 2. A quantity equal to the raw oil introduced at point 1 less the vapors removed from tower 3 is produced as the desalted product.

If desirable, mechanical agitation may be substituted for the baffles of tower 5. An orifice mixer followed by a settler drum, or a mechanically agitated mixing tank followed by a settler may take the place of tower 5. The whole point is that admixture of oil and water should be thorough, but not of sufficient violence to recreate the emulsions which have been destroyed.

If suitable means is available the raw oil may be heated by an external device before entering at point 1, thereby eliminating the necessity of recirculating the stream of oil through heater 2. Many salt bearing oils cannot be heated by direct heat application without precipitating the salt in the heating equipment and in such cases the indirect transfer of heat as described above is necessary.

It will be appreciated that the important features of this process are (1) a complete resolution and breaking of any emulsion present by heating the oil to an extent sufficient to remove all of the water under the pressure existing within the system, and leaving the crystallized salt in finely dispersed form distributed throughout the oil, and (2) washing the oil with water under carefully controlled conditions not conducive to the formation of emulsions for the removal of the finely dispersed and distributed salt.

It will of course be understood that the removal of water, so performed, will not remove water of crystallization, or water similarly associated with solid substantially dry salt particles, and where, in this specification and the claims, the removal of water associated with the salt is spoken of, this fact is recognized.

I claim:

1. The method of removing salt from crude petroleum which comprises heating the oil to a temperature sufficient to remove substantially the water associated with said salt and reduce said salt to a dispersed solid, said heating being predominantly by mixing a separate stream of heated desalted oil with said crude oil, vaporizing water from heated oil, removing the resultant water vapor, then washing said mixed oils with water at an elevated temperature which is below the boiling point of water under pressure conditions obtaining in the system.

2. The method of removing salt from crude petroleum which comprises heating the oil to a temperature sufficient to remove substantially the water associated with said salt and reduce said salt to a dispersed solid, said heating being predominantly by mixing a separate stream of heated oil which has been previously desalted with said crude oil, vaporizing water from mixed oil, removing the resultant water vapor, then washing said mixed oils with water at an elevated temperature which is below the boiling point of water under pressure conditions obtaining in the system.

3. The method of removing salt from crude petroleum which comprises heating the oil to a temperature sufficient to remove substantially the water associated with said salt and reduce said salt to a dispersed solid, said heating being predominantly by mixing a separate stream of heated oil with said crude oil, vaporizing water from mixed oil, removing the resultant water vapor, then washing said mixed oils with water at on elevated temperature which is below the boiling point of water under pressure conditions obtaining in the system, removing a portion of said washed oil, heating said portion, and admixing it with the incoming crude oil to bring about the first named heating step.

4. The method of desalting a water and salt bearing petroleum which comprises heating a substantially salt-free, substantially dry petroleum fluid materially to raise its temperature, commingling under pressure a stream of said fluid with a stream of said petroleum, said fluid supplying heat units adequate to raise the temperature of said petroleum stream to above the vaporization temperature of the water content of the petroleum at the pressure of the system, vaporizing said water content and withdrawing the vapors thereby to free the salt from its previous association with water and render it readily separable from the petroleum, flowing water in contact with the petroleum in a washing step to remove salt therefrom, withdrawing dry salt-free petroleum from the washing step and heating a portion thereof as said fluid to be commingled with further quantities of said water and salt-bearing petroleum.

5. Apparatus for desalting a water and salt-bearing petroleum comprising a furnace, heating coils in said furnace, means for withdrawing heated fluid from said furnace, means to commingle with said heated fluid a stream of said petroleum, means defining an enlarged zone, means to conduct the commingled petroleum and fluid to and discharge the same into the upper part of said zone, means for withdrawing vapors from the top of said zone, baffling means in said zone below the point of discharge of fluids therein, a washing chamber, baffles within said chamber, means to conduct fluid from the bottom of said enlarged zone to the bottom of said chamber below said baffles, means to admit water to said chamber above said baffles, means to discharge water from the bottom of said chamber, means to withdraw dry salt-free petroleum from the top of said chamber, and means to conduit a portion of the petroleum so withdrawn to said coils.

EMORY M. SKINNER.